Jan. 27, 1931.  W. D. WRIGHT  1,790,566
FILM FIRE EXTINGUISHER
Filed April 16, 1928   2 Sheets-Sheet 1

Walter D. Wright, Inventor

By Geo. W. Bullard, Attorney

Jan. 27, 1931.  W. D. WRIGHT  1,790,566
FILM FIRE EXTINGUISHER
Filed April 16, 1928  2 Sheets-Sheet 2

Walter D. Wright, Inventor

By Geo. W. Bullard, Attorney

Patented Jan. 27, 1931

1,790,566

UNITED STATES PATENT OFFICE

WALTER D. WRIGHT, OF TACOMA, WASHINGTON

FILM-FIRE EXTINGUISHER

Application filed April 16, 1928. Serial No. 270,229.

My invention relates to devices for extinguishing film fires within the reel chamber or magazine of a motion picture projecting machine. The objects of my invention are, first, to provide a supply of extinguishing fluid at or near the reel chamber and so connected therewith as to instantly and effectively discharge two or more streams onto the reel within the reel chamber by automatic means and thus extinguish the film fire before it gets beyond control and cause the destruction of life and property; second, to so direct the two or more streams of extinguishing fluid onto the film reel as to cause the reel to turn in the direction that will keep the film closely wound thereon and prevent the fire burning into the body of the film, and third, to provide an extinguishing fluid or receptacle or tank in constant discharging connection with and into a reel chamber of a motion picture machine, and said tank containing fluids in separate receptacles and means for mixing said fluids automatically or by the will of the operator of the motion picture machine and when mixed, will so effervesce as to develop a high pressure and cause an instant discharge onto the burning film within the reel chamber, and further, the fluid mixture thus formed will be an effective film fire extinguisher that will promptly put out the fire and thus prevent the loss of the picture film and also avoid delay in showing the picture during the progress of the motion picture show.

I attain these objects by means of the mechanism illustrated in the accompanying drawings which are shown with the inclosing cabinet or cover removed, and in which:—

Figure 1:
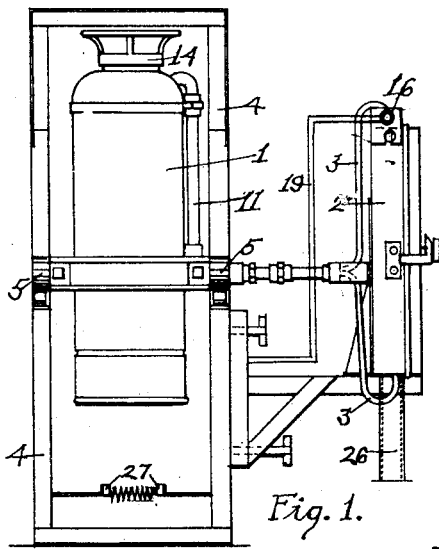
Figure 2:
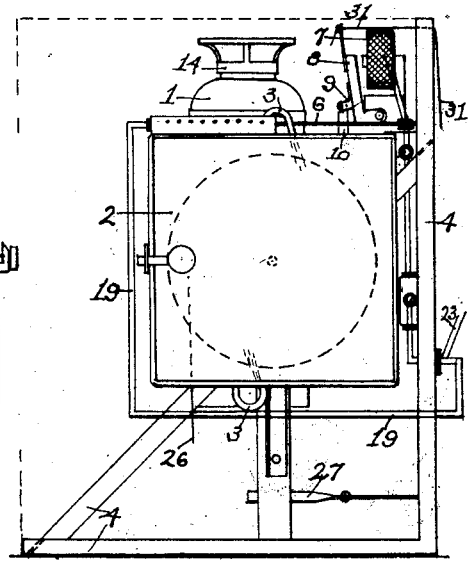
Figure 3:
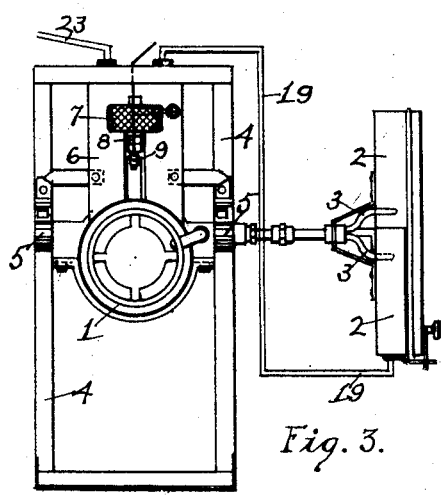
Figure 4:
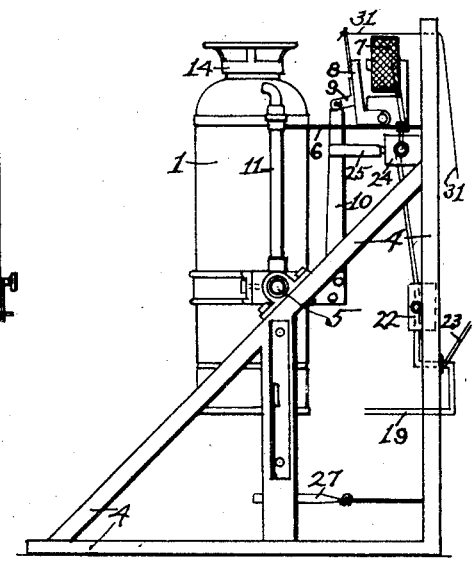
Figure 5:
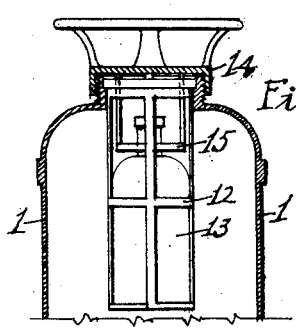
Figure 6:
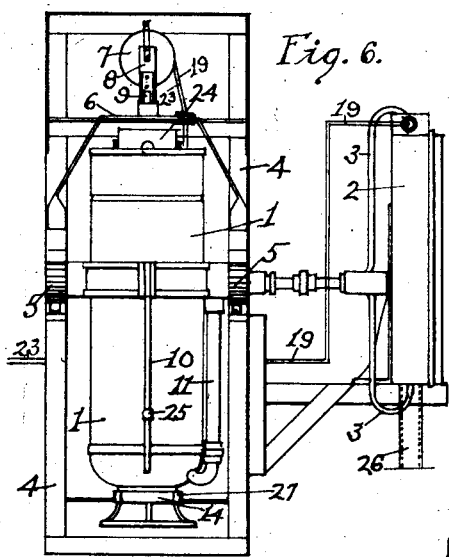
Figure 7:
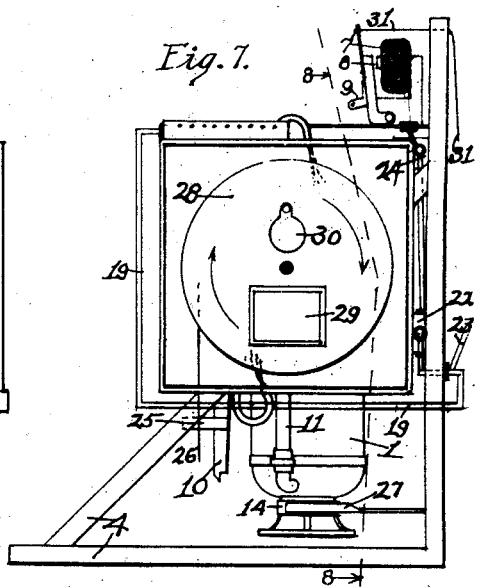
Figure 8:
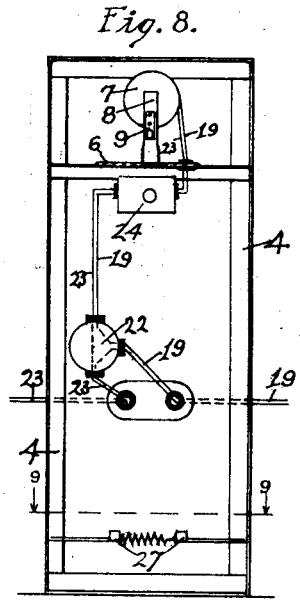
Figure 10:
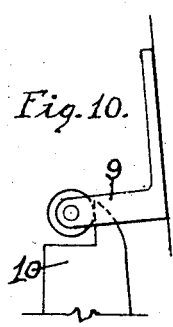
Figure 11:
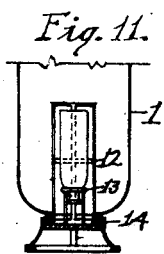
Figure 9:
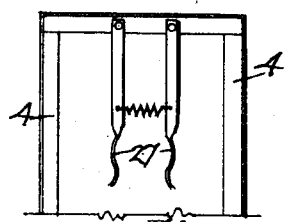
Figure 12:
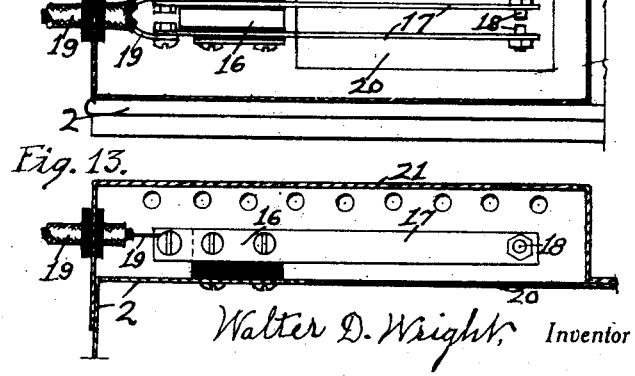
Figure 13:
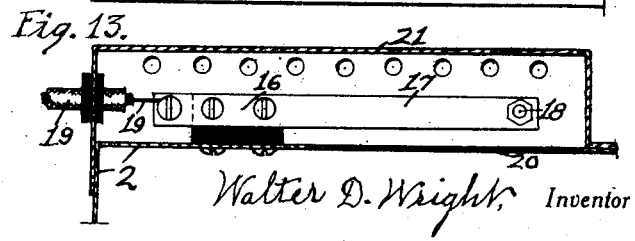

Figure 1 is a front view of my invention with a film reel chamber attached and connections shown whereby the extinguishing fluid can be discharged therein; Fig. 2 is a side view of Fig. 1; Fig. 3 is a top view of Fig. 1; Fig. 4 is a view of Fig. 2 with the film chamber removed to more clearly show the mounting of the container tank and the operating mechanism; Fig. 5 is an enlarged section of the top of the container tank and shows the separate container suspended therein; Fig. 6 is a view the same as Fig. 1 with the tank inverted as when in operation; Fig. 7 is a side view of Fig. 6 with the door removed from the film chamber to show the action of the extinguishing fluid on the film and reel; Fig. 8 is a view of the device back of the container tank from the line 8—8 and shows the electrical wire connections; Fig. 9 is a downward view on the line 9—9 to show the spring actuated clamp to hold the neck of the tank when inverted; Fig. 10 is an enlarged view of the trip catch designed to hold the tank in its upright position; Fig. 11 is a section of the top of the tank when inverted; Fig. 12 is a top view of the thermostat within the cover on top of the film reel chamber, the cover being shown in section, and Fig. 13 is a side view of Fig. 12 the top cover being shown in section.

Similar characters refer to similar parts in the several views.

Motion picture films are so very inflammable that great caution is required to prevent their taking fire from the intense heat of the lamp of the projection machine. Film fires most frequently occur from the breaking of a film while being run through a projecting machine. The loose end of the film coming from the supply reel being exposed to the heat takes fire and invariably travels on the film into the chamber of the supplying reel where it burns so rapidly that the chamber often explodes with the intense heat when the fire spreads, often with serious results, unless kept within the fire-proof projecting room. In such events the film is destroyed, causing serious loss and delay, and frequently painful alarm in the progress of a motion picture show. To extinguish such a fire at its beginning and prevent the loss and delay, it is necessary to promptly discharge onto the film within the reel chamber some fluid that will effectively extinguish the fire therein before the film is destroyed and further damage is done. To attain this result is the aim and purpose of my invention.

Referring to the drawings, my invention comprises a fluid container tank 1 made to hold two and one-half gallons of fluid. It is constructed to stand 350 pounds pressure required by the Underwriter's inspection.

The tank is located in a fixed position near the motion picture projecting machine and so connected with the reel chamber 2 by two or more tubes 3—3 with their open ends fixed to discharge onto the reel and film within the chamber.

In the drawing, the reel chamber 2 is shown fixed to the frame on which the tank 1 is mounted. It is shown in this compact form to set forth the action and application of the invention. It is to be understood the extinguisher can be set free of the projecting machine and have flexible tubular and electric wire connections with the reel chamber at any convenient distance.

The tank 1 is pivotally mounted on a suitable frame 4—4 of light angle irons or other material. The pivotal mountings 5—5 are so located off the vertical center and below the horizontal center of the tank that it will readily tilt to an inverted position when set free to do so. A stay plate 6 fixed to the back of the frame is designed to stop the tank in an upright position as shown in Figs. 1, 2, 3 and 4. On this plate 6 is mounted an electro-magnet 7 with a circuit closing bar 8 pivotally mounted thereon. On this bar 8 is fixed a roller bearing trip catch 9 designed to engage and hold the point of an arm 10 fixed to the body of the tank 1 which is thereby held against the stay plate 6. The action of the electro-magnet, when energized, will draw the circuit closing bar 8, throw the trip catch 9 and set the tank 1 free to tilt by gravity to an inverted position as shown in Figs. 6 and 7.

Near the top of the tank 1 is connected an exhaust pipe 11. This pipe 11 is shown to extend down to connect with a pipe outlet in one of the pivotal bearings 5 and thence toward the reel chamber 2 where it divides into the two discharge tubes 3—3 previously mentioned. As hereinbefore observed, the invention is not limited to this pivotal outlet, but a flexible discharge tube of suitable length may be used instead.

To charge the tank for service a solution of soda in pure water is put in till the tank is almost full. Within a vertical basket 12 suspended from the neck of the tank is placed an 8-oz. bottle 13 almost filled with sulphuric acid unstopped. The screw top 14 with a fixed smaller basket 15 encircling the neck of the bottle is then screwed on tightly as shown in Fig. 5. The two fluids are thus ready to be automatically mixed when the tank is inverted.

The extinguisher is operated automatically by the electro-magnet 7 connected with a sensitive thermostat 16 located on top of the reel chamber 2 and directly above the point where the fire will enter the reel chamber. The thermostat is composed of two thermostatic metal bars 17 so set that heat will cause them to bend or move toward each other. These bars are each provided with adjustable contact points 18 at their free ends, whereby a slight inward bending of the two bars will cause the points to contact and close the electric circuit on the two wires 19 attached to the bars 17. By referring to the Figs. 12 and 13, it will be seen that the bars 17 extend over an opening 20 in the top of the reel chamber, and that a ventilated hood 21 incloses the thermostat whereby the same is promptly effected by the fire heat. By referring to the drawings, particularly Fig. 8, it will be seen the wires 19 are extended to enter the back of the extinguisher cabinet and into a junction box 22 where one wire is connected with one of the service supply wires 23, and the other wire 19 with the other service wire 23 are continued through a double pole switch 24 and up to connect with the electro-magnet 7. The service supply wires 23 through a plug and socket at the cabinet wall are to be connected with a local electrical supply circuit.

The tank arm 10 has an extension 25 fixed thereon which contacts and closes the double pole switch 24 when the tank 1 is set in its upright position and the electric circuit to the thermostat is thereby made alive and the extinguisher is ready for service.

On the breaking of a film as at 26 and ignition takes place, the fire will instantly follow the film into the reel chamber and produce a quick heat. The sensitive thermostat 16 affected thereby promptly closes the electric circuit. The electro-magnet promptly draws the circuit closing bar 8 which releases the trip catch 9 and the tank at once tilts to an inverted position as shown in Figs. 6 and 7. The acid contents of the open bottle 13 will empty into the solution of soda causing an effervesence that will develop a high pressure within the tank. The exhaust outlet now being at the bottom of the fluid, the pipe 11 will supply each discharging tube 3 through which the burning film will be quickly and thoroughly saturated with the extinguishing fluid as indicated in Fig. 7. It is to be observed that each discharge outlet is so inclined that they make a tangent contact with the film reel, quickly revolving it in the opposite direction from which it was turning and will wind up the film, thus keeping it compact together and prevent the fire burning into the body of the reel.

It will be observed that on tilting the tank 1 that the double pole switch 24 is automatically opened and the electric circuit to the reel chamber is broken thus preventing a short circuit being made by the splashing fluid. It will be further seen that the tank on tilting to an inverted position, the neck is engaged by the spring actuated clutch 27 and is thereby held stationary.

An improvement is indicated in the film reel as shown in Fig. 7, in which the sides of the reel are closed disks instead of being perforated or open sides as now commonly used. The reel 28 has an opening 29 closed with isinglass through which the film can be seen, while the finger hole 30 with a pivotally hung cover enables the operator to hook the film to the axle for winding.

The invention is designed to operate by the operator or other person, should the electrical mechanism become inoperative. A small cord 31 attached to an extension on the closing bar 8 provides a means for releasing the trip catch 9 when the extinguisher will function as herein-to-fore described.

After the fire is extinguished, the tank can be turned to its former upright position and thus avoid further flooding of the premises. When the effervescing gas is exhausted, the tank can be again charged for future service.

The fluid formed by the mixture of sulphuric acid with the soda water solution is proved to be much more effective in putting out a film fire than is pure water. However, I do not limit myself to the use of this mixture only, but claim the right to use other fluid mixtures where a like result can be attained.

It is to be observed that the extinguishing fluid may be discharged into the real chamber from each of the four sides as well as from two sides if thought best to make the work of putting out the fire more sure and prompt.

It is to be further observed the extinguisher is designed to be inclosed within a suitable cabinet wherein it is so securely protected that nothing can prevent its operation.

I do not limit myself to the thermostatic and electro-magnet means of tripping the container tank but reserve the right to use a fusible link for the same result as set forth in my patent on a Film-fire extinguisher issued on April 15th, 1924, bearing No. 1,490,880.

Having described my invention, I claim:—

1. In a film-fire extinguisher having a pivotally mounted gravity tilting container tank adapted to be normally held in an upright position with thermostatic control means for releasing said tank, in association with a film reel container, a pipe connection extending from the container tank into the reel container, said pipe positioned within the reel container to direct a flow of fluid tangentially upon the film reel in a direction the reverse of the normal direction of rotation of said reel, whereby the discharge of the fire extinguishing fluid upon the reel will operate to rotate it to wind up the film thereon and maintain the film wound.

2. The device specified in claim 1, in which the discharge pipe communicates with a plurality of discharge nozzles each arranged to direct a flow of the fire extinguishing fluid tangentially of the film reel as specified.

3. The device of claim 1, in which the thermostatic control device operates through electrical connections with a cutoff switch in the thermostatic electrical circuit, and means carried by the tank to operate said switch whereby when said tank is in its upright position the switch is closed and when said tank is tilted to an inverted position the switch is open.

4. The device of claim 1, with a spring actuated grip clutch adapted to engage said tank when tilted to an inverted position and hold it stationary.

WALTER D. WRIGHT.